US011401419B2

(12) United States Patent
Uta et al.

(10) Patent No.: US 11,401,419 B2
(45) Date of Patent: Aug. 2, 2022

(54) DEALCOHOLIZATION ROOM-TEMPERATURE CURABLE ORGANOPOLYSILOXANE COMPOSITION, AND ARTICLE SEALED BY CURED PRODUCT OF SAME

(71) Applicant: SHIN-ETSU CHEMICAL CO., LTD., Tokyo (JP)

(72) Inventors: Akira Uta, Annaka (JP); Takafumi Sakamoto, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 67 days.

(21) Appl. No.: 16/325,331

(22) PCT Filed: Jun. 16, 2017

(86) PCT No.: PCT/JP2017/022261
§ 371 (c)(1),
(2) Date: Feb. 13, 2019

(87) PCT Pub. No.: WO2018/037682
PCT Pub. Date: Mar. 1, 2018

(65) Prior Publication Data
US 2019/0177542 A1 Jun. 13, 2019

(30) Foreign Application Priority Data
Aug. 26, 2016 (JP) .............................. JP2016-165252

(51) Int. Cl.
| C08L 83/04 | (2006.01) |
| C08L 83/06 | (2006.01) |
| C08K 5/544 | (2006.01) |
| C08K 5/5415 | (2006.01) |
| C09J 183/06 | (2006.01) |
| C09K 3/10 | (2006.01) |
| C09D 183/06 | (2006.01) |
| C08K 5/5425 | (2006.01) |
| C09D 7/63 | (2018.01) |
| C09D 7/62 | (2018.01) |
| C09D 183/04 | (2006.01) |
| C09J 11/04 | (2006.01) |
| C09J 11/06 | (2006.01) |
| C09J 183/04 | (2006.01) |

(52) U.S. Cl.
CPC .............. *C08L 83/04* (2013.01); *C08K 5/544* (2013.01); *C08K 5/5425* (2013.01); *C08L 83/06* (2013.01); *C09D 7/62* (2018.01); *C09D 7/63* (2018.01); *C09D 183/04* (2013.01); *C09D 183/06* (2013.01); *C09J 11/04* (2013.01); *C09J 11/06* (2013.01); *C09J 183/04* (2013.01); *C09J 183/06* (2013.01); *C09K 3/10* (2013.01); *C09K 3/1018* (2013.01); *C08L 2201/08* (2013.01); *C08L 2205/025* (2013.01); *C09K 2200/0239* (2013.01); *C09K 2200/0494* (2013.01); *C09K 2200/0685* (2013.01)

(58) Field of Classification Search
CPC ....... C08L 83/04; C08L 83/06; C09D 183/04; C09D 183/06; C08G 77/16; C08G 77/18; C08G 77/20; C09J 183/06; C09J 183/04; C08K 5/5425; C08K 5/544; C09K 2200/0685
See application file for complete search history.

(56) References Cited

U.S. PATENT DOCUMENTS

| 4,721,765 A | 1/1988 | Inoue et al. |
| 5,180,771 A * | 1/1993 | Arai ..................... C08K 5/5465 524/588 |

(Continued)

FOREIGN PATENT DOCUMENTS

| JP | 53-34855 A | 3/1978 |
| JP | 62-232459 A | 10/1987 |

(Continued)

OTHER PUBLICATIONS

Machine translation into English of Kameda et al; JP 2006-265485 A; (Year: Oct. 2006).*

(Continued)

*Primary Examiner* — Karuna P Reddy
(74) *Attorney, Agent, or Firm* — Birch, Stewart, Kolasch & Birch, LLP

(57) ABSTRACT

This dealcoholization room-temperature curable organopolysiloxane composition contains (A) a diorganopolysiloxane having a silicon atom-bonded hydroxy group and/or a hydrolyzable silyl group at both ends of the molecular chain, and has a coefficient of viscosity of 20-1,000,000 mPa·s, (B) an organopolysiloxane which is a partial (co-) hydrolysis-condensation product of a hydrolyzable organosilane compound having one or more silicon atom-bonded alkenyl groups and 1-3 silicon atom-bonded alkoxy groups, per molecule, (C) a hydrolyzable organosilane compound having one or more phenylene backbones and two or more amino groups, per molecule, and/or a partial hydrolysis-condensation product thereof. The dealcoholization room-temperature curable organopolysiloxane composition has good curability and storage stability even when the composition does not contain a metal catalyst, is less toxic to the human body and is environmentally friendly, is cost-competitive, and has good rubber physical properties and adhesiveness after being cured.

16 Claims, No Drawings

(56) References Cited

U.S. PATENT DOCUMENTS

| | | | |
|---|---|---|---|
| 5,231,207 A | 7/1993 | Yanagisawa et al. | |
| 2002/0091220 A1* | 7/2002 | Kimura | C08K 5/544 528/10 |
| 2003/0069379 A1 | 4/2003 | Inoue et al. | |
| 2003/0162928 A1 | 8/2003 | Sadanaga et al. | |
| 2003/0220443 A1 | 11/2003 | Kameda et al. | |
| 2004/0002571 A1 | 1/2004 | Sakamoto et al. | |
| 2005/0014894 A1* | 1/2005 | Flannigan | C08K 5/31 524/864 |
| 2006/0217498 A1* | 9/2006 | Kameda | C08L 83/04 525/477 |
| 2007/0273051 A1* | 11/2007 | Kato | C08L 83/04 257/791 |
| 2007/0298256 A1* | 12/2007 | Fukui | C08L 83/04 428/402.24 |
| 2011/0009558 A1 | 1/2011 | Maliverney et al. | |
| 2015/0315438 A1 | 11/2015 | Sakamoto et al. | |
| 2016/0208152 A1* | 7/2016 | Araki | C08K 5/544 |

FOREIGN PATENT DOCUMENTS

| | | |
|---|---|---|
| JP | 5-105689 A | 4/1993 |
| JP | 9-118827 A | 5/1997 |
| JP | 2002-121385 A | 4/2002 |
| JP | 2003-119387 A | 4/2003 |
| JP | 2003-226862 A | 8/2003 |
| JP | 2004-35631 A | 2/2004 |
| JP | 2004-43778 A | 2/2004 |
| JP | 2006-265485 A | 10/2006 |
| JP | 2008-274161 A | 11/2008 |
| JP | 2009-197190 A | 9/2009 |
| JP | 2010-180382 A | 8/2010 |
| JP | 2011-509317 A | 3/2011 |
| JP | 2013-241533 A | 12/2013 |
| JP | 2015-131938 A | 7/2015 |
| JP | 2016-8228 A | 1/2016 |
| WO | WO 2014/097574 A1 | 6/2014 |
| WO | WO-2015045221 A * | 4/2015 |

OTHER PUBLICATIONS

International Search Report, issued in PCT/JP2017/022261, PCT/ISA/210, dated Sep. 19, 2017.

Written Opinion of the International Searching Authority, issued in PCT/JP2017/022261, PCT/ISA/237, dated Sep. 19, 2017.

* cited by examiner

DEALCOHOLIZATION ROOM-TEMPERATURE CURABLE ORGANOPOLYSILOXANE COMPOSITION, AND ARTICLE SEALED BY CURED PRODUCT OF SAME

TECHNICAL FIELD

The present invention relates to a dealcoholization type room-temperature curable organopolysiloxane composition, particularly to a room-temperature curable organopolysiloxane composition which is favorably cured without using an organotin catalyst or a titanium chelate catalyst which has been conventionally indispensable to provide a silicone rubber cured product having excellent adhesiveness (elastomeric organopolysiloxane cured product), and an article using a cured product of the composition (silicone rubber), such as an automotive part.

BACKGROUND ART

An oil-resistant gasket and a packing material made of cork, organic rubber, asbestos, and the like have been conventionally used for a seal around an automotive engine. However, use thereof has a disadvantage that stock management and work processes are complicated, and further has a disadvantage that sealing performance thereof is not reliable. For this reason, a formed in place gasket (FIPG) system utilizing a room-temperature curable organopolysiloxane composition as a liquid gasket has been adopted for this type of use.

Since the dealcoholization type room-temperature curable organopolysiloxane composition has poor reactivity without a catalyst, it is necessary to use an organotin catalyst or a titanium chelate catalyst in order to impart sufficient curability. However, use of a product containing an organotin compound may be restricted due to toxicity thereof. Particularly in EU countries, a product with a weight ratio of more than 0.1% in terms of tin cannot be used since 2012.

In a case where the composition contains an organotin compound, cracking occurs due to cleavage of a main chain of an organopolysiloxane, resulting in a decrease in hardness with time disadvantageously. In a case where the composition contains an organotitanium compound, a curing rate is slow, or a cured product (rubber) discolors with time disadvantageously.

In recent years, reduction in weight of an automotive part has been achieved in order to improve fuel economy of an automobile. In recent years, the number of automotive parts made of an organic resin which is a lighter material than metal such as iron or aluminum is increasing. Among the resins, a polyphenylene sulfide (PPS) resin having excellent characteristics such as high heat resistance, chemical resistance, and flame retardancy has attracted much attention. However, the polyphenylene sulfide resin has excellent characteristics, but is a hardly-adhesive material having large difficulty in bonding. Among nylon resins, nylon 66 having excellent heat resistance, chemical resistance, and mechanical strength is widely used for an automobile and the like. However, it is known that it is difficult to bond nylon 66 as well.

As a dealcoholization type room-temperature curable organopolysiloxane composition using a catalyst other than a tin catalyst and a titanium catalyst, Patent Document 1 (WO 2014/097574) has reported a dealcoholization type room-temperature curable organopolysiloxane composition free of a metal catalyst by introducing an alkoxysilyl ethylene bond into a curing agent and using a guanidine-based organic catalyst as a curing catalyst, and has solved these problems, but has a disadvantage that a method for synthesizing the curing agent is special to increase cost.

As another tin alternative method, use of a bismuth compound has been reported. Patent Document 2 (JP-A 2003-119387) has proposed a silicone composition using a bismuth compound as a catalyst, but has a disadvantage that a physical property value of a resulting compound changes with time. In addition, Patent Document 3 (JP-A 2011-509317) describes that a chelate type bismuth catalyst is effective. However, the chelate type bismuth catalyst has a disadvantage that a curing rate is slow and it is difficult to obtain the catalyst.

Regarding study on improvement of resin adhesiveness, Patent Document 4 (JP-A 2004-043778) discloses that a room-temperature curable organopolysiloxane composition to provide a silicone rubber cured product having favorable adhesiveness to a polyphenylene sulfide resin and nylon 66 is obtained by blending ferrite. Patent Document 5 (JP-A 2004-035631) discloses that a room-temperature curable organopolysiloxane composition to provide a silicone rubber cured product having favorable adhesiveness to a polyphenylene sulfide resin is obtained by blending an organoxysilane or a partial hydrolytic condensate thereof with a titanium chelate catalyst.

However, various organic resins used in an automotive part, an electric/electronic product, or the like have improved durability technology through recent improvement of a resin, and has had larger difficulty in bonding in recent years. The number of cases where an organic resin cannot be bonded with a conventional composition has increased. The above composition used for sealing, adhesion, or coating for a building sealing material, an electric/electronic device, or the like does not have sufficient adhesiveness to a polyphenylene sulfide resin or nylon 66.

PRIOR ART DOCUMENTS

Patent Documents

Patent Document 1: WO 2014/097574
Patent Document 2: JP-A 2003-119387
Patent Document 3: JP-A 2011-509317
Patent Document 4: JP-A 2004-043778
Patent Document 5: JP-A 2004-035631

SUMMARY OF INVENTION

Technical Problem

The present invention has been achieved in view of the above circumstances, and an object of the present invention is to provide a dealcoholization type room-temperature curable organopolysiloxane composition having favorable curability and storage stability even being free of a metal catalyst, less toxic to a human body and environmentally friendly, cost-competitive, and having favorable rubber physical properties and adhesiveness after being cured, and an article using a cured product of the composition.

Solution to Problem

As a result of intensive studies in order to achieve the above object, the present inventors have found that, in a room-temperature curable organopolysiloxane composition, a room-temperature curable organopolysiloxane composition containing a compound obtained by partial (co-)hydrolytic condensation of a specific dealcoholization type hydrolyzable organosilane compound (siloxane oligomer) as a curing agent and a hydrolyzable organosilane compound having a phenylene backbone and two or more amino groups in a molecule and/or a partial hydrolytic condensate thereof and a room-temperature curable organopolysiloxane composition containing the composition and a guanidine group-containing organic catalyst have ability to solve the above problem, and have completed the present invention.

That is, the present invention provides the following dealcoholization type room-temperature curable organopolysiloxane composition, an article sealed by a cured product of the composition, and the like.

[1]

A dealcoholization type room-temperature curable organopolysiloxane composition comprising (A) 100 parts by weight of a diorganopolysiloxane having one silicon atom-bonded hydroxy group and/or one hydrolyzable silyl group at each of both molecular chain terminals and having a viscosity of 20 to 1,000,000 mPa·s at 23° C., (B) 0.1 to 40 parts by weight of an organopolysiloxane which is a partial (co-)hydrolytic condensate of a hydrolyzable organosilane compound having one or more silicon atom-bonded alkenyl groups and 1 to 3 silicon atom-bonded unsubstituted or substituted alkoxy groups in one molecule, other than the component (A), and (C) 0.001 to 10 parts by weight of a hydrolyzable organosilane compound having at least one phenylene backbone and two or more amino groups in one molecule and/or a partial hydrolytic condensate thereof, other than the components (A) and (B).

[2]

The dealcoholization type room-temperature curable organopolysiloxane composition according to [1], further comprising as a catalyst component (D), one or more selected from the group consisting of a non-silicon-based organic compound, a hydrolyzable organosilane compound and a partial hydrolytic condensate thereof, having at least one guanidine backbone represented by the following general formula (6) in one molecule, other than the components (B) and (C), in an amount of 0.001 to 5 parts by weight per 100 parts by weight of the component (A):

[Chem. 1]

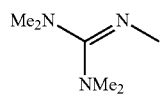
(6)

wherein Me represents a methyl group.

[3]

The dealcoholization type room-temperature curable organopolysiloxane composition according to [1] or [2], further comprising as a storability improving component (E), an organodisilazane compound represented by the following general formula (7), in an amount of 0.5 to 10 parts by weight per 100 parts by weight of the component (A):

[Chem. 2]

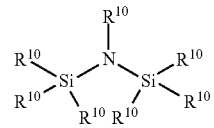
(7)

wherein $R^{10}$ represents a hydrogen atom, an alkyl group having 1 to 3 carbon atoms, or a vinyl group, and all of $R^{10}$s may be the same or different.

[4]

The dealcoholization type room-temperature curable organopolysiloxane composition according to any one of [1] to [3], further comprising one or more surface-treated or surface-untreated inorganic fillers selected from the group consisting of calcium carbonate, atomized silica, precipitated silica, carbon black and aluminum oxide, in an amount of 10 to 500 parts by weight per 100 parts by weight of the component (A).

[5]

The dealcoholization type room-temperature curable organopolysiloxane composition according to any one of [1] to [4], wherein the component (B) is a partial (co-)hydrolytic condensate of one or more hydrolyzable silane compounds represented by the following general formula (3), or a partial co-hydrolytic condensate of one or more of said hydrolyzable silane compounds and one or more hydrolyzable silane compounds represented by the following general formula (4):

wherein $R^3$ represents an unsubstituted or substituted monovalent hydrocarbon group free of an aliphatic unsaturated bond having 1 to 18 carbon atoms, $R^4$ represents an alkenyl group having 2 to 10 carbon atoms, $R^5$s each independently represent an unsubstituted or substituted monovalent hydrocarbon group having 1 to 18 carbon atoms, and c represents 0 or 1.

wherein $R^3$ and $R^5$ are as defined above, and d represents 0, 1, or 2.

[6]

The dealcoholization type room-temperature curable organopolysiloxane composition according to any one of [1] to [5], wherein the component (C) is a hydrolyzable organosilane compound represented by the following general formula (5) and/or a partial hydrolytic condensate thereof.

[Chem. 3]

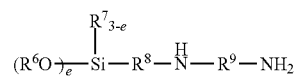
(5)

wherein $R^6$s each independently represent an unsubstituted or substituted monovalent hydrocarbon group having 1 to 18 carbon atoms, $R^7$ represents an unsubstituted monovalent hydrocarbon group having 1 to 18 carbon atoms, $R^8$ represents a divalent hydrocarbon group having 1 to 10 carbon atoms, $R^9$ represents an aromatic ring-containing divalent hydrocarbon group having 7 to 10 carbon atoms, and e represents a positive number of 1 to 3, with the proviso that at least one of an NH group and an NH$_2$ group is not directly bonded to an aromatic ring of R$^9$.

[7]

The dealcoholization type room-temperature curable organopolysiloxane composition according to any one of [1] to [6], which is free of an organotin catalyst or a titanium chelate catalyst.

[8]

The dealcoholization type room-temperature curable organopolysiloxane composition according to any one of [1] to [7], which provides a cured product to be bonded to nylon 6, an acrylic resin, a polybutylene terephthalate resin, a polystyrene resin, or a polycarbonate resin.

[9]

The dealcoholization type room-temperature curable organopolysiloxane composition according to any one of [1] to [8], which is used for an adhesive, a sealing material, a potting agent, or a coating agent.

[10]

An automotive part sealed by a cured product of the dealcoholization type room-temperature curable organopolysiloxane composition according to any one of [1] to [8].

[11]

An automotive oil seal sealed by a cured product of the dealcoholization type room-temperature curable organopolysiloxane composition according to any one of [1] to [8].

[12]

An electric or electronic part sealed by a cured product of the dealcoholization type room-temperature curable organopolysiloxane composition according to any one of [1] to [8].

[13]

A structure for building or civil engineering work sealed by a cured product of the dealcoholization type room-temperature curable organopolysiloxane composition according to any one of [1] to [8].

[14]

An adhesive, a sealing material, a potting agent, or a coating agent comprising the dealcoholization type room-temperature curable organopolysiloxane composition according to any one of [1] to [8].

Advantageous Effects of Invention

The dealcoholization type room-temperature curable organopolysiloxane composition of the present invention is cured favorably without using a metal catalyst to provide a silicone rubber cured product having favorable adhesiveness to a polyphenylene sulfide resin and nylon 66, and further having favorable adhesiveness to nylon 6, an acrylic resin, a polybutylene terephthalate (PBT) resin, a polystyrene (PS) resin, and a polycarbonate (PC) resin (elastomeric organopolysiloxane cured product).

DESCRIPTION OF EMBODIMENTS

Hereinafter, the present invention is described in detail. Note that a viscosity is a value measured by a rotational viscometer in conformity with the method specified in JIS Z 8803 in the present invention. Unless otherwise specified, "room temperature" refers to a state at a temperature of 23° C.±5° C. and a humidity of 50% RH±5% RH.

[Component (A)]

A component (A) is a diorganopolysiloxane having one silanol group (that is, a silicon atom-bonded hydroxy group) and/or one hydrolyzable silyl group at each of both molecular chain terminals, and a main component (base polymer) of the organopolysiloxane composition of the present invention.

The molecular structure of the diorganopolysiloxane is not particularly limited and may be linear, branched, or linear with a branched structure, but is preferably a linear diorganopolysiloxane having each of both molecular chain terminals blocked with a diorganohydroxysilyl group or a silyl group having 1 to 3 hydrolyzable groups, for example, a triorganosilyl group containing a hydrolyzable group, such as a diorganoalkoxysilyl group, an organodialkoxysilyl group or a trialkoxysilyl group, and having a main chain basically formed of repeated diorganosiloxane units. The linear diorganopolysiloxane may have a small amount of a branched structure.

The diorganopolysiloxane may have a silalkylene structure (—Si—R—Si—) in the middle of a molecular chain (for example, in a connecting portion between a diorganohydroxysilyl group or a hydrolyzable group-containing triorganosilyl group existing at each of both molecular chain terminals and a terminal of a repeating structure of a diorganosiloxane unit constituting a main chain). In this formula, R represents a divalent hydrocarbon group having 1 to 20 carbon atoms, preferably 2 to 6 carbon atoms (for example, a linear or branched alkylene group). Some or all of hydrogen atoms bonded to carbon atoms may be substituted with a halogen atom or a cyano group.

The diorganopolysiloxane as the component (A) has a viscosity of 20 to 1,000,000 mPa·s, preferably of 100 to 300,000 mPa·s, more preferably of 1,000 to 200,000 mPa·s, particularly preferably of 10,000 to 100,000 mPa·s at 23° C. If the viscosity of the diorganopolysiloxane is less than the above lower limit value (20 mPa·s), a large amount of a component (B) described later is required, and therefore this is economically disadvantageous. If the viscosity of the diorganopolysiloxane exceeds the upper limit value (1,000,000 mPa·s), workability is lowered, and therefore this is not preferable. Note that the viscosity can be usually measured with a rotational viscometer (for example, BL type, BH type, BS type, cone plate type, or rheometer) in the present invention.

The hydrolyzable group included in the diorganopolysiloxane as the component (A) is preferably an alkoxy group or an alkoxy-substituted alkoxy group. The number of hydroxy groups (silanol groups) and hydrolyzable groups existing at each terminal of the diorganopolysiloxane is not particularly limited. In a case where the diorganopolysiloxane has a hydroxy group (silanol group) at a terminal, the diorganopolysiloxane preferably has one silicon atom-bonded hydroxy group (silanol group) at each of both molecular chain terminals (that is, exists as a hydroxydiorganosilyl group). In a case where the diorganopolysiloxane has an alkoxy group or an alkoxy-substituted alkoxy group as a hydrolyzable group at a terminal, the diorganopolysiloxane preferably has two or three silicon atom-bonded alkoxy groups (that is, alkoxysilyl groups) or two or three silicon atom-bonded alkoxy-substituted alkoxy groups (that is, alkoxyalkoxysilyl groups) at each of both molecular chain terminals (that is, exists as a dialkoxy organosilyl group, a bis(alkoxyalkoxy) organosilyl group, a trialkoxysilyl group, or a tris(alkoxyalkoxy) silyl group).

Here, the alkoxy group is preferably an alkoxy group having 1 to 10 carbon atoms, particularly 1 to 4 carbon atoms, and examples thereof include a methoxy group, an ethoxy group, a propoxy group, an isopropoxy group, a butoxy group, an isobutoxy group, a tert-butoxy group, a hexyloxy group, and an octyloxy group. The alkoxy-substituted alkoxy group is preferably an alkoxy-substituted alkoxy group having 2 to 10 carbon atoms in total, particularly preferably 3 or 4 carbon atoms in total, and examples thereof include a methoxymethoxy group, a methoxyethoxy group, and an ethoxymethoxy group. In the present invention, a group having a hydroxy group, a methoxy group, or an ethoxy group at each terminal of the diorganopolysiloxane is particularly preferable.

Examples of a silicon atom-bonded organic group other than a hydroxy group and a hydrolyzable group include an unsubstituted or substituted monovalent hydrocarbon group having 1 to 18 carbon atoms, preferably 1 to 10 carbon atoms. Examples of the monovalent hydrocarbon group include: an alkyl group such as a methyl group, an ethyl group, a propyl group, an isopropyl group, a butyl group, an isobutyl group, a tert-butyl group, a hexyl group, an octyl group, or a 2-ethylhexyl group; a cycloalkyl group such as a cyclopentyl group or a cyclohexyl group; an alkenyl group such as a vinyl group or an allyl group; an aryl group such as a phenyl group, a tolyl group, or a naphthyl group; an aralkyl group such as a benzyl group, a phenylethyl group, or a phenylpropyl group; a group in which some or all of hydrogen atoms bonded to carbon atoms of these groups are substituted with halogen atoms such as fluorine atoms, bromine atoms, or chlorine atoms or cyano groups, for example, a halogenated monovalent hydrocarbon group such as a trifluoropropyl group or a chloropropyl group; and a cyanoalkyl group such as a 3-cyanoethyl group or a γ-cyanopropyl group. Among these groups, a methyl group is preferable.

The diorganopolysiloxane as the component (A) is particularly preferably a compound represented by the following general formula (1).

[Chem. 4]

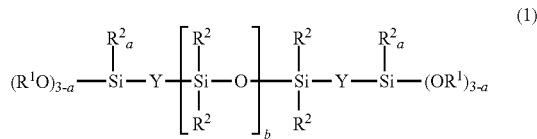

(1)

In the above formula (1), $R^1$s each independently represent a group selected from the group consisting of a hydrogen atom; an alkyl group having 1 to 10 carbon atoms, such as a methyl group, an ethyl group, a propyl group, a butyl group, or an octyl group; and an alkoxy-substituted alkyl group having 2 to 10 carbon atoms, such as a methoxymethyl group, a methoxyethyl group, or an ethoxymethyl group. $R^1$ preferably represents a hydrogen atom, a methyl group, or an ethyl group. $R^2$s each independently represent an unsubstituted or substituted monovalent hydrocarbon group having 1 to 18 carbon atoms, preferably 1 to 10 carbon atoms. Examples of the monovalent hydrocarbon group include those exemplified as the above-described organic group other than a hydroxy group and a hydrolyzable group, and a methyl group is preferable among the groups. a represents 0, 1, or 2. Particularly in a case where $R^1$ represents an alkyl group or an alkoxy-substituted alkyl group, a preferably represents 0 or 1, and in a case where $R^1$ represents a hydrogen atom, a preferably represents 2. b represents such a number that the viscosity of the diorganopolysiloxane at 23° C. is 20 to 1,000,000 mPa·s, preferably 100 to 300,000 mPa·s, more preferably 1,000 to 200,000 mPa·s, and particularly 10,000 to 100,000 mPa·s. Usually, b represents an integer of 1 to 2,000, preferably of 10 to 1,500, more preferably of 50 to 1,200, particularly of about 100 to 1,000.

Incidentally, in the present invention, the degree of polymerization (or molecular weight) can be determined as a number average degree of polymerization (or number average molecular weight) or the like in terms of polystyrene in gel permeation chromatography (GPC) analysis using toluene as a developing solvent.

In the above formula (1), Ys each independently represent an oxygen atom, an unsubstituted or substituted divalent hydrocarbon group having 1 to 20 carbon atoms, preferably 1 to 6 carbon atoms, or a group represented by the following general formula (2).

[Chem. 5]

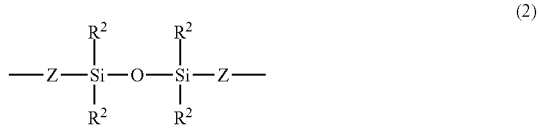

(2)

In formula (2), $R^2$ is as defined in the above formula (1), and Z represents an unsubstituted or substituted divalent hydrocarbon group having 1 to 20 carbon atoms, preferably 1 to 6 carbon atoms. The divalent hydrocarbon group (Y or Z) may be linear or may have a branched structure (for example, a methylethylene group), but is particularly preferably a linear alkylene group such as a methylene group, an ethylene group, a propylene group (trimethylene group), a butylene group (tetramethylene group), or a hexylene group (hexamethylene group). Among these groups, an ethylene group is particularly preferable as Z. An oxygen atom is particularly preferable as Y.

The diorganopolysiloxane as the component (A) can be manufactured by a conventionally known method.

The diorganopolysiloxane may be used singly or in combination of two or more kinds thereof. Particularly, a diorganopolysiloxane having a hydroxysilyl group at each of both molecular chain terminals (that is, a diorganopolysiloxane in which $R^1$ at each terminal is a hydrogen atom in the above formula (1)) is contained preferably in an amount of 10 to 100 parts by weight, more preferably in an amount of 50 to 100 parts by weight per 100 parts by weight of the component (A).

[Component (B)]

The component (B) is an organopolysiloxane which is a partial (co-)hydrolytic condensate of a hydrolyzable organosilane compound having one or more silicon atom-bonded alkenyl groups in one molecule and having 1 to 3, preferably 2 or 3 silicon atom-bonded unsubstituted or substituted alkoxy groups in one molecule, other than the component (A). The organopolysiloxane (that is, partial (co-)hydrolytic condensate of a hydrolyzable organosilane compound) is preferably an organopolysiloxane (oligomer) having one or more, preferably 2 to 102, more preferably 2 to 50, still more preferably 2 to 20 silicon atom-bonded alkenyl groups such as vinyl groups in one molecule and having at least 2 (usually 2 to 104), preferably 3 or more (for example, 3 to 52), more preferably 4 to 22 silicon atom-bonded unsubstituted or substituted alkoxy groups in one molecule, other than the component (A), and is preferably a partial (co-)hydrolytic condensate of one or more hydrolyzable silane compounds represented by the following general formula (3) or a partial co-hydrolytic condensate of one or more of the hydrolyzable silane compounds represented by general formula (3) and one or more hydrolyzable silane compounds represented by the following general formula (4).

Note that, in the present invention, the "partial (co-)hydrolytic condensate" refers to an organopolysiloxane (oligomer) having at least 2, preferably 3 or more residual hydrolyzable groups (for example, unsubstituted or substituted alkoxy groups) in a molecule, generated by partially hydrolyzing and condensing one hydrolyzable organosilane compound as a raw material singly or by partially co-hydrolyzing and condensing two or more of the hydrolyzable organosilane compounds.

$$R^3_c R^4 Si(OR^5)_{3-c} \quad (3)$$

wherein $R^3$ represents an unsubstituted or substituted monovalent hydrocarbon group free of an aliphatic unsaturated bond having 1 to 18 carbon atoms, and $R^4$ represents an alkenyl group having 2 to 10 carbon atoms, $R^5$s each independently represent an unsubstituted or substituted monovalent hydrocarbon group having 1 to 18 carbon atoms, and c represents 0, 1, or 2, preferably 0 or 1, and more preferably 0.

$$R^3_d Si(OR^5)_{4-d} \quad (4)$$

wherein $R^3$ and $R^5$ are as defined above, and d represents 0, 1, or 2, preferably 1 or 2, and more preferably 1.

The component (B) acts as a crosslinking agent (curing agent) that undergoes a condensation reaction with the component (A) to form a crosslinked structure. However, in the present invention, the component (B) is a compound other than the component (A) and components (C) and (D) described later.

In the above formulas (3) and (4), examples of the unsubstituted or substituted monovalent hydrocarbon group free of an aliphatic unsaturated bond having 1 to 18 carbon atoms, preferably 1 to 10 carbon atoms for $R^3$ include: an alkyl group such as a methyl group, an ethyl group, a propyl group, an isopropyl group, a butyl group, an isobutyl group, a tert-butyl group, a pentyl group, a hexyl group, a heptyl group, an octyl group, 2-ethylhexyl group, a nonyl group, a decyl group, or an octadecyl group; a cycloalkyl group such as a cyclopentyl group or a cyclohexyl group; an aryl group such as a phenyl group, a tolyl group, a xylyl group, or a naphthyl group; an aralkyl group such as a benzyl group, a phenethyl group, or a phenylpropyl group; a group in which some or all of hydrogen atoms bonded to carbon atoms of these groups are substituted with halogen atoms such as fluorine atoms, bromine atoms, or chlorine atoms or cyano groups, for example, a halogenated monovalent hydrocarbon group such as a trifluoropropyl group or a chloropropyl group; and a cyanoalkyl group such as a β-cyanoethyl group or a γ-cyanopropyl group. A methyl group and a phenyl group are particularly desirable.

In the above formula (3), examples of the alkenyl group having 2 to 10 carbon atoms for $R^4$ include an alkenyl group such as a vinyl group or an allyl group. A vinyl group is particularly preferable.

In the above formulas (3) and (4), examples of the unsubstituted or substituted monovalent hydrocarbon group having 1 to 18 carbon atoms, preferably 1 to 10 carbon atoms for $R^5$ include: an alkyl group such as a methyl group, an ethyl group, a propyl group, an isopropyl group, a butyl group, an isobutyl group, a tert-butyl group, a pentyl group, a hexyl group, a heptyl group, an octyl group, 2-ethylhexyl group, a nonyl group, a decyl group, or an octadecyl group; a cycloalkyl group such as a cyclopentyl group or a cyclo-hexyl group; an alkenyl group such as a vinyl group or an allyl group; an aryl group such as a phenyl group, a tolyl group, a xylyl group, or a naphthyl group; an aralkyl group such as a benzyl group, a phenethyl group, or a phenylpropyl group; a group in which some or all of hydrogen atoms bonded to carbon atoms of these groups are substituted with halogen atoms such as fluorine atoms, bromine atoms, or chlorine atoms or cyano groups, for example, a halogenated monovalent hydrocarbon group such as a trifluoropropyl group or a chloropropyl group; and a cyanoalkyl group such as a 3-cyanoethyl group or a γ-cyanopropyl group. A methyl group and an ethyl group are particularly desirable.

Examples of the organopolysiloxane (partial (co-)hydrolytic condensate) of the component (B) include: as a hydrolyzable organosilane compound as a raw material, a single partial hydrolytic condensate formed only of an alkoxysilane having an alkenyl group in a molecule, such as vinyltrimethoxysilane, vinyltriethoxysilane, allyltrimethoxysilane, or allyltriethoxysilane; a partial co-hydrolytic condensate formed only of two or more alkenyl group-containing alkoxysilanes; and a partial co-hydrolytic condensate formed of one or more alkenyl group-containing alkoxysilanes exemplified above and one or more alkoxysilanes free of an alkenyl group in a molecule, such as methyltrimethoxysilane, ethyltrimethoxysilane, decyltrimethoxysilane, phenyltrimethoxysilane, methyltriethoxysilane, ethyltriethoxysilane, phenyltriethoxysilane, tetramethoxysilane, or tetraethoxysilane. As described above, the siloxane may contain the plurality of different silane compound backbones in a molecule.

The number average molecular weight (or number average degree of polymerization) of the organopolysiloxane is not particularly limited, but an oligomer obtained by polymerizing 2 to 102, preferably 2 to 20 silane compounds described above is preferable.

The component (B) may be a mixture of oligomers having a plurality of degrees of polymerization. The component (B) may be used singly or in combination of two or more kinds thereof.

The component (B) improves reactivity, for example, by selectively applying a product obtained by partially (co-)hydrolyzing and condensing a conventionally and commonly used general-purpose curing agent, such as vinyl trialkoxysilane, and has an important influence on a curing mechanism not requiring a metal catalyst, which is one of the characteristics of the present invention. In addition, the component (B) can be synthesized relatively easily from a general-purpose curing agent, and therefore is highly price-competitive. Examples of the component (B) include the following.

[Chem. 6]

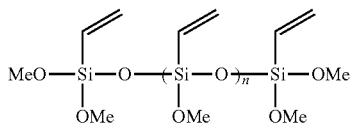

[Chem. 7]

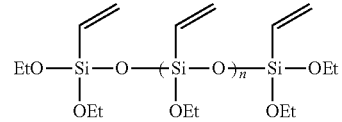

[Chem. 8]

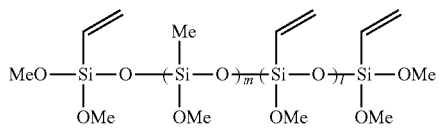

[Chem. 9]

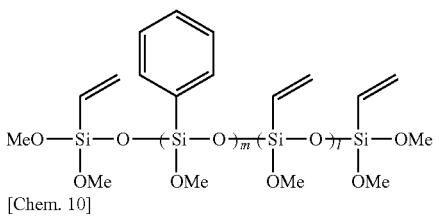

[Chem. 10]

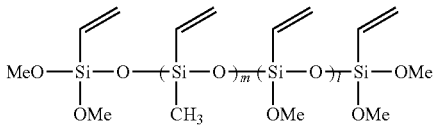

[Chem. 11]

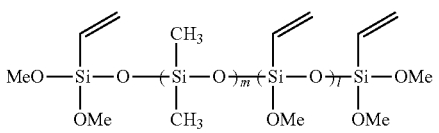

[Chem. 12]

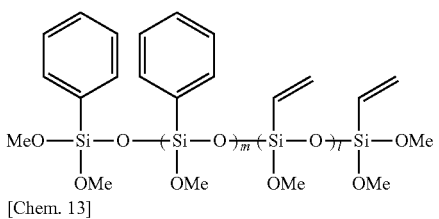

[Chem. 13]

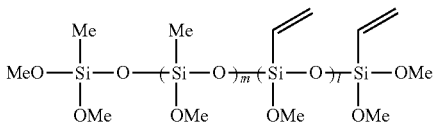

wherein n represents an integer of 0 to 100, m represents an integer of 1 to 100, and l represents an integer of 0 to 99, provided that m+l=1 to 100, and Me represents a methyl group, and Et represents an ethyl group.

The blending amount of the component (B) is 0.1 to 40 parts by weight, and preferably 1 to 20 parts by weight per 100 parts by weight of the component (A). If the amount of the component (B) is less than the lower limit value (0.1 parts by weight), curability and storability may be deteriorated. If the amount of the component (B) exceeds the upper limit value (40 parts by weight), not only a disadvantage in terms of price may be generated, but also elongation of a cured product may decrease, or durability may be deteriorated. Particularly, in a case where the component (A) contains a diorganopolysiloxane having a hydroxy group at a terminal, the amount of the component (B) is preferably set to such an amount that the number of hydrolyzable groups in the component (B) exceeds the number of hydroxy groups in the component (A).

Note that, in the present invention, in addition to the organopolysiloxane as the component (B), as a crosslinking agent (curing agent), the silane compound represented by the above formulas (3) and (4) (a single substance which has not been subjected to hydrolytic condensation) may be used in combination with the component (B). In this case, the use amount of these silane compounds is preferably 1 to 80% by weight of the organopolysiloxane as the component (B), and particularly preferably 3 to 40% by weight thereof.

[Component (C)]

A component (C) is a hydrolyzable organosilane compound having at least one phenylene backbone and two or more amino groups in one molecule and/or a partial hydrolytic condensate thereof, other than the components (A) and (B). Particularly, the component (C) is a hydrolyzable organosilane compound having at least one phenylene backbone and two or more amino groups in one molecule and having 1 to 3, preferably 2 or 3, more preferably 3 hydrolyzable groups in one molecule and/or a partial hydrolytic condensate thereof (that is, a siloxane oligomer having at least 2, preferably 3 or more residual hydrolyzable groups). This component (C) is estimated to largely contribute to a fact that a cured product (silicone rubber) obtained by curing the room-temperature curable organopolysiloxane composition of the present invention has favorable adhesiveness to a polyphenylene sulfide resin and nylon 66. The reason is estimated to be that the component (C) easily moves from the inside of a siloxane matrix in a cured product (silicone rubber) to a surface of the cured product because of having a phenylene backbone and two or more amino groups in one molecule, and the component (C) is strongly bonded to a polyphenylene sulfide resin and nylon 66. Therefore, the component (C) is an important component of the present invention as an adhesiveness improver (adhesion accelerator).

As the component (C), a silane coupling agent having at least one phenylene backbone and two or more amino groups in one molecule can be applied. Particularly, examples of the component (C) include a hydrolyzable organosilane compound and/or a partial hydrolytic condensate thereof, represented by the following general formula (5).

[Chem. 14]

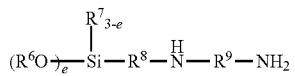

(5)

wherein $R^6$s each independently represent an unsubstituted or substituted monovalent hydrocarbon group having 1 to 18 carbon atoms, $R^7$ represents an unsubstituted monovalent hydrocarbon group having 1 to 18 carbon atoms, $R^8$ represents a divalent hydrocarbon group having 1 to 10 carbon atoms, $R^9$ represents an aromatic ring-containing divalent hydrocarbon group having 7 to 10 carbon atoms, and e represents a positive number of 1 to 3, provided that at least one of an NH group and an $NH_2$ group is not directly bonded to an aromatic ring of $R^9$.

The silane compound represented by the above formula (5) is an alkoxysilane compound having an NH group (imino group) and an $NH_2$ group (amino group) and having an aromatic ring (phenylene backbone) between the NH group and the $NH_2$ group, at least one of the NH group and the $NH_2$ group not being directly bonded to a carbon atom constituting the aromatic ring (phenylene backbone), and is described in detail in JP-A H05-105689.

In the above formula (5), examples of the unsubstituted or substituted monovalent hydrocarbon group having 1 to 18 carbon atoms, preferably 1 to 10 carbon atoms for $R^6$ include: an alkyl group such as a methyl group, an ethyl group, a propyl group, an isopropyl group, a butyl group, an isobutyl group, a tert-butyl group, a pentyl group, a hexyl group, a heptyl group, an octyl group, 2-ethylhexyl group, a nonyl group, a decyl group, or an octadecyl group; a cycloalkyl group such as a cyclopentyl group or a cyclohexyl group; an alkenyl group such as a vinyl group or an allyl group; an aryl group such as a phenyl group, a tolyl group, a xylyl group, or a naphthyl group; an aralkyl group such as a benzyl group, a phenethyl group, or a phenylpropyl group; a group in which some or all of hydrogen atoms bonded to carbon atoms of these groups are substituted with halogen atoms such as fluorine atoms, bromine atoms, or chlorine atoms or cyano groups, for example, a halogenated monovalent hydrocarbon group such as a trifluoropropyl group or a chloropropyl group; and a cyanoalkyl group such as a β-cyanoethyl group or a γ-cyanopropyl group. A methyl group and an ethyl group are particularly desirable.

Examples of the unsubstituted monovalent hydrocarbon group having 1 to 18 carbon atoms, preferably 1 to 10 carbon atoms for $R^7$ include: an alkyl group such as a methyl group, an ethyl group, a propyl group, an isopropyl group, a butyl group, an isobutyl group, a tert-butyl group, a pentyl group, a hexyl group, a heptyl group, an octyl group, 2-ethylhexyl group, a nonyl group, a decyl group, or an octadecyl group; a cycloalkyl group such as a cyclopentyl group or a cyclohexyl group; an alkenyl group such as a vinyl group or an allyl group; an aryl group such as a phenyl group, a tolyl group, a xylyl group, or a naphthyl group; and an aralkyl group such as a benzyl group, a phenethyl group, or a phenylpropyl group. A methyl group is particularly desirable.

Examples of the divalent hydrocarbon group having 1 to 10 carbon atoms for $R^8$ include: an alkylene group such as a methylene group, an ethylene group, a propylene group, a tetramethylene group, a hexamethylene group, an octamethylene group, a decamethylene group, or a 2-methylpropylene group; an arylene group such as a phenylene group; and a group in which an alkylene group and an arylene group are bonded. A methylene group, an ethylene group, and a propylene group are preferable, and a propylene group is particularly preferable.

The aromatic ring-containing divalent hydrocarbon group having 7 to 10 carbon atoms for $R^9$ is preferably a group in which a phenylene group and an alkylene group are bonded, and examples thereof include groups represented by the following formulas.

—$C_6H_4$—$CH_2$—

—$C_6H_4$—$CH_2$—$CH_2$—

—$CH_2$—$C_6H_4$—

—$CH_2$—$C_6H_4$—$CH_2$—

—$CH_2$—$C_6H_4$—$CH_2$—$CH_2$—

—$CH_2$—$CH_2$—$C_6H_4$—

—$CH_2$—$CH_2$—$C_6H_4$—$CH_2$—

—$CH_2$—$CH_2$—$C_6H_4$—$CH_2$—$CH_2$—

—$CH_2$—$CH_2$—$CH_2$—$C_6H_4$—

—$CH_2$—$CH_2$—$CH_2$—$C_6H_4$—$CH_2$—

Among these groups, —$CH_2$—$C_6H_4$—$CH_2$— is particularly preferable.

In this case, the alkylene group bonded to the right side of the phenylene group (on the $NH_2$ side in formula (5)) (which may be the —$NH_2$ group in the absence of an alkylene group) may be in an ortho position, a meta position, or a para position.

Examples of the silane compound represented by the above general formula (5) include the following.

[Chem.15]

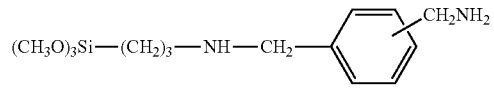

[Chem. 16]

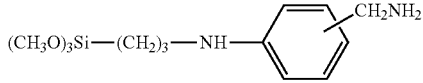

[Chem. 17]

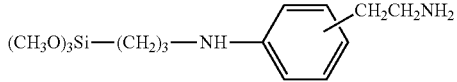

[Chem.18]

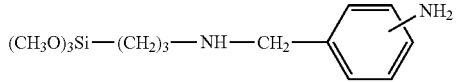

[Chem.19]

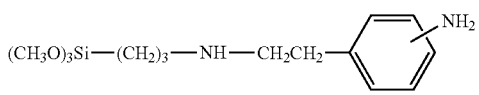

[Chem. 20]

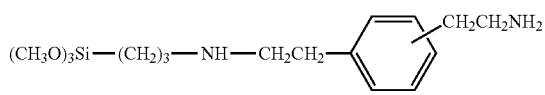

[Chem. 21]

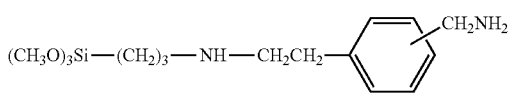

[Chem. 22]

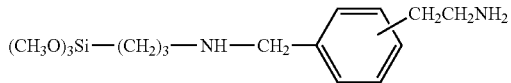

[Chem. 23]

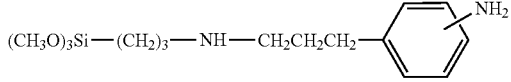

[Chem. 24]

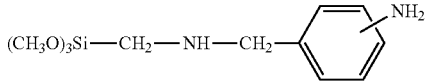

[Chem. 25]

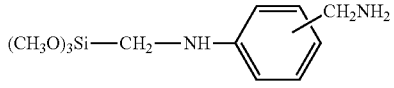

[Chem. 26]
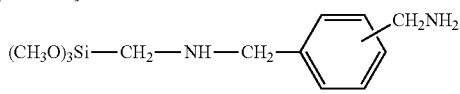
[Chem. 27]
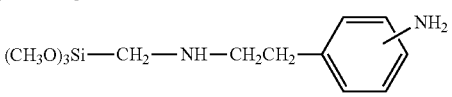
[Chem. 28]
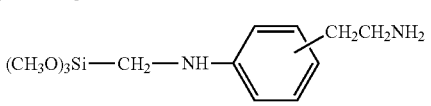
[Chem. 29]
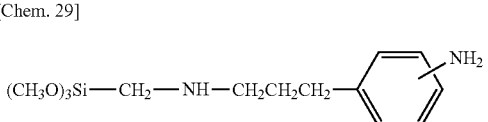
[Chem. 30]
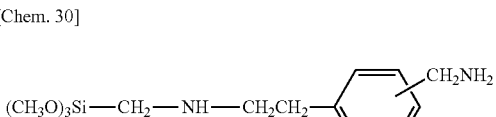
[Chem. 31]
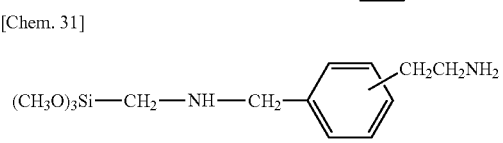
[Chem. 32]
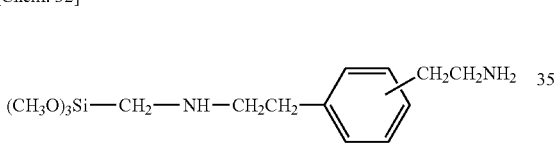
[Chem. 33]
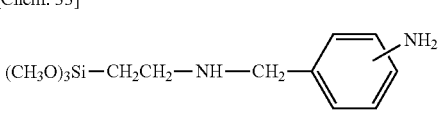
[Chem. 34]
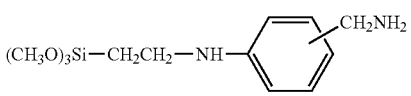
[Chem. 35]
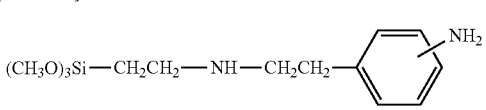
[Chem. 36]
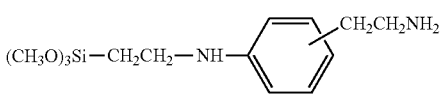
[Chem. 37]
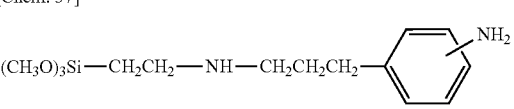
[Chem. 38]
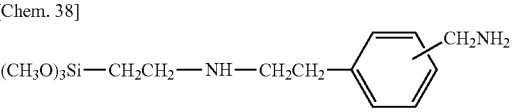
[Chem. 39]
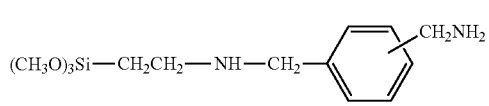
[Chem. 40]
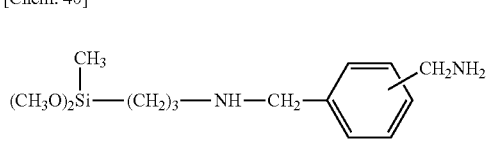
[Chem. 41]
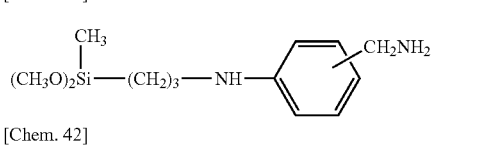
[Chem. 42]
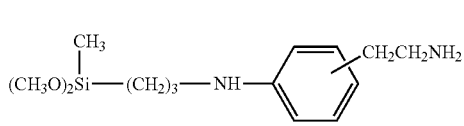
[Chem. 43]
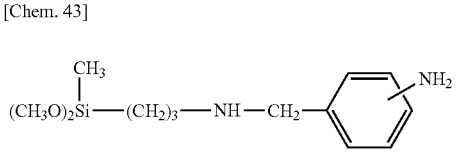
[Chem. 44]
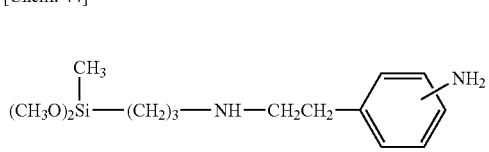
[Chem. 45]
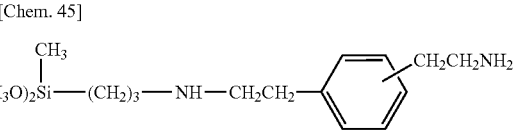
[Chem. 46]
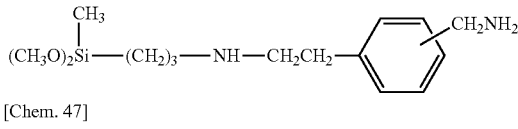
[Chem. 47]
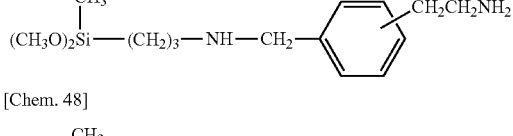
[Chem. 48]
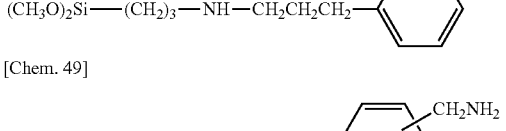
[Chem. 49]
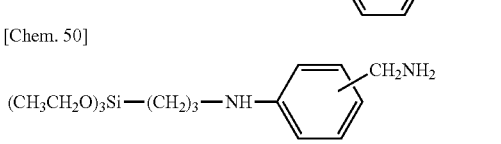
[Chem. 50]

[Chem. 51]
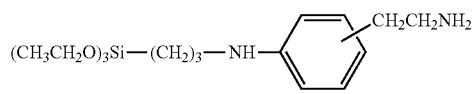

[Chem. 52]
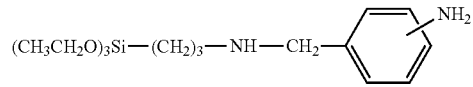

[Chem. 53]
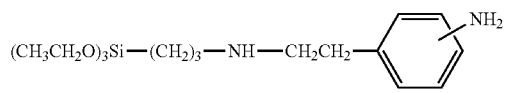

[Chem. 54]
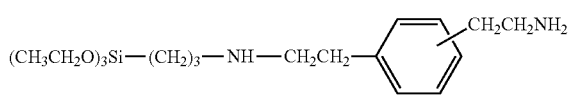

[Chem. 55]
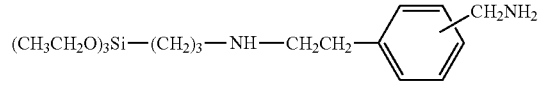

[Chem. 56]
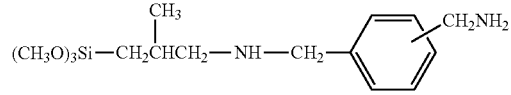

[Chem. 57]
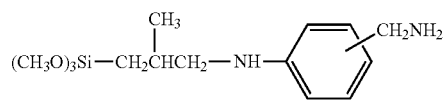

[Chem. 58]
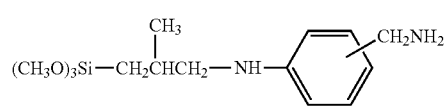

[Chem. 59]
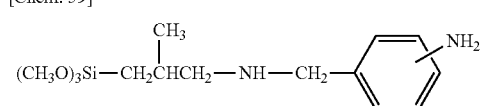

[Chem. 60]
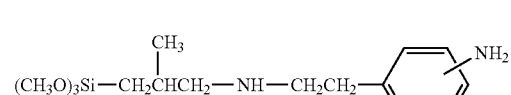

[Chem. 61]
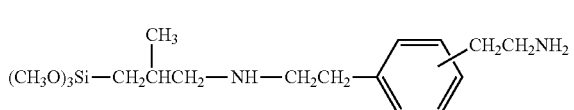

[Chem. 62]
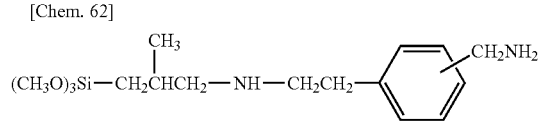

[Chem. 63]
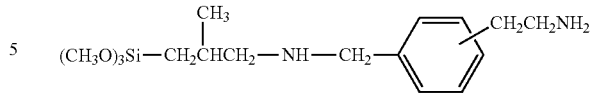

[Chem. 64]
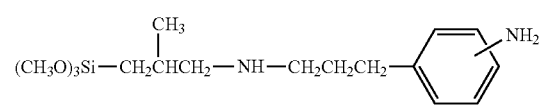

[Chem. 65]
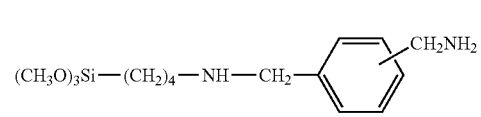

[Chem. 66]
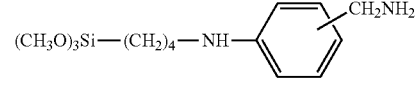

[Chem. 67]
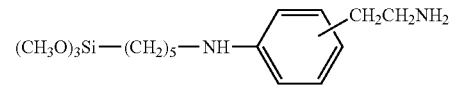

[Chem. 68]
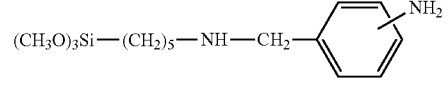

[Chem. 69]
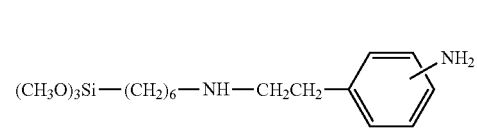

[Chem. 70]
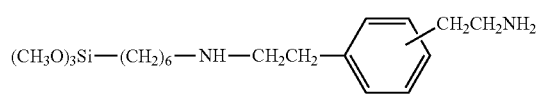

[Chem. 71]
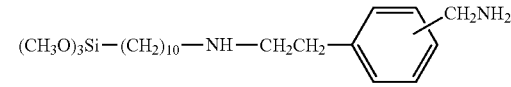

[Chem. 72]
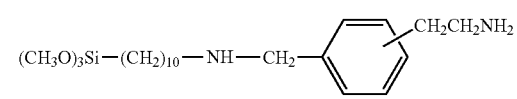

[Chem. 73]
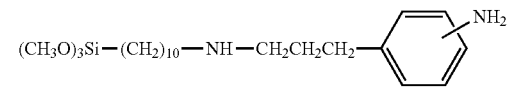

The blending amount of the component (C) is 0.001 to 10 parts by weight, preferably 0.01 to 7 parts by weight, more preferably 0.05 to 5 parts by weight, and most preferably 0.2 to 2 parts by weight per 100 parts by weight of the component (A). If the amount of the component (C) is less than the lower limit value (0.001 parts by weight), desired adhesiveness cannot be obtained. If the amount of the component (C) exceeds the upper limit value (10 parts by weight), not only a disadvantage in terms of price may be generated, but also elongation may decrease, oil resistance may decrease, water resistance may decrease, or durability may be deteriorated.

[Component (D)]

A component (D) is one or more selected from the group consisting of a non-silicon-based organic compound and a hydrolyzable organosilane compound and a partial hydrolytic condensate thereof (organic silicon compound), having at least one guanidine backbone in one molecule, other than the components (B) and (C). The component (D) acts as a catalyst component in the dealcoholization type room-temperature curable organopolysiloxane composition of the present invention, and imparts favorable curability and adhesiveness to the composition of the present invention.

Here, the guanidine backbone is represented by the following general formula (6).

[Chem. 74]

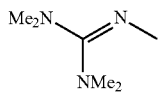

(6)

wherein Me represents a methyl group.

Specific examples of the non-silicon-based organic compound and the organic silicon compound, having at least one guanidine backbone in a molecule of the component (D), include: an inorganic guanidine such as guanidine hydrochloride, guanidine carbonate, guanidine nitrate, guanidine sulfate, or guanidine phosphate; an organic guanidine such as aminoguanidine, 1,1,3,3-tetramethylguanidine, n-dodecylguanidine, methylolguanidine, dimethylolguanidine, 1-phenylguanidine, 1,3-diphenylguanidine, 1,3-di-o-tolyl guanidine, triphenylguanidine, or 1-benzyl-2,3-dimethylcyanoguanidine; and an alkoxysilane such as 1,1,3,3-tetramethyl-2-[3-(trimethoxysilyl) propyl] guanidine and a hydrolytic condensate thereof (siloxane). Among these compounds, an organic guanidine and an alkoxysilane and a hydrolytic condensates thereof are preferably used. Among these compounds, an alkoxysilane such as 1,1,3,3-tetramethyl-2-[3-(trimethoxysilyl) propyl] guanidine and a hydrolytic condensate thereof are particularly preferably used.

The guanidine backbone-containing non-silicon-based organic compound and/or organic silicon compound as a catalyst component which is the component (D) may be used singly or in combination of two or more kinds thereof.

The non-silicon-based organic compound and/or organic silicon compound having at least one guanidine backbone in a molecule is used in a range preferably of 0.001 to 5 parts by weight, more preferably of 0.01 to 4 parts by weight, particularly preferably of 0.1 to 3 parts by weight per 100 parts by weight of the organopolysiloxane as the component (A). A too small blending amount may deteriorate curability of the composition. A too large blending amount may deteriorate odor or storability.

[Component (E)]

An organodisilazane compound as a component (E) acts as a storability improver imparting favorable storage stability to the dealcoholization type room-temperature curable organopolysiloxane composition of the present invention. A storability improving component used as the component (E) is an organodisilazane compound represented by the following general formula (7).

[Chem. 75]

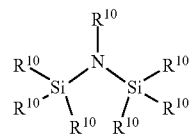

(7)

wherein $R^{10}$ represents a hydrogen atom, an alkyl group having 1 to 3 carbon atoms, or a vinyl group, and all of $R^{10}$s may be the same or different.

In the above formula (7), $R^{10}$ represents a hydrogen atom, an alkyl group having 1 to 3 carbon atoms, or a vinyl group. Among these, a hydrogen atom, a methyl group, and an ethyl group are preferable, and a hydrogen atom and a methyl group are more preferable. All of $R^{10}$s may be the same or different.

Specific examples of the component (E) include hexamethyldisilazane, hexaethyldisilazane, 1,3-divinyl-1,1,3,3-tetramethyldisilazane, 1,3-divinyl-1,1,3,3-tetraethyldisilazane, heptamethyldisilazane, and 1,1,3,3-tetraethyldisilazane. These compounds may be used singly or in combination of two or more kinds thereof at the same time.

The blending amount of the storability improving component (E) is preferably 0.5 to 10 parts by weight, and more preferably 1 to 7 parts by weight per 100 parts by weight of the component (A). If the blending amount is less than 0.5 parts by weight, there is a concern that storability may be deteriorated. If the blending amount exceeds 10 parts by weight, curability of the composition may be deteriorated.

[Other Components]

In addition to the above components, it is possible to further contain an additive generally known for a resin composition as long as the additive does not impair the effect of the present invention. Examples of the additive include: colloidal calcium carbonate, heavy (or pulverization method) calcium carbonate, atomized silica, precipitated silica, quartz fine powder, carbon black, diatomaceous earth powder, aluminum hydroxide powder, particulate alumina, magnesia powder, aluminum oxide powder, zinc oxide powder, and a fine powdery inorganic filler obtained by surface treatment thereof with a silane, a silazane, a low polymerization degree polysiloxane, a hydrocarbon (a paraffin or an olefin), a fatty acid, a rosin acid, or the like; a coloring agent such as a pigment, a dye, or a fluorescent brightening agent; an antibacterial agent; an antifungal agent; a plasticizer; and a polyether.

It is particularly preferable to use an inorganic filler obtained by surface-treating one or more selected from the group consisting of calcium carbonate, atomized silica (fumed silica), precipitated silica (wet silica), carbon black, and aluminum oxide with a silane, a silazane, a low polymerization degree polysiloxane, a hydrocarbon (a paraffin or an olefin), a fatty acid, a rosin acid, or the like, or an untreated inorganic filler. In the case of blending these additives, the blending amount thereof can be preferably 10 to 500 parts by weight, and more preferably 30 to 200 parts by weight per 100 parts by weight of the component (A).

The dealcoholization type room-temperature curable organopolysiloxane composition of the present invention exhibits favorable curability without using a metal catalyst, and a cured product thereof (silicone rubber) has favorable adhesiveness to a polyphenylene sulfide resin and nylon 66, and further has excellent adhesiveness to nylon 6, an acrylic resin, a polybutylene terephthalate (PBT) resin, a polystyrene (PS) resin, and a polycarbonate (PC) resin. Therefore, the room-temperature curable organopolysiloxane composition of the present invention is useful as an adhesive, a sealing material, a coating agent, a potting agent, or the like. A method for using the room-temperature curable organopolysiloxane composition of the present invention as an adhesive, a sealing material, a coating agent, or a potting agent only needs to be in accordance with a conventionally known method.

Examples of a target article include an automotive part, an automotive oil seal, an electric/electronic part, an electric wire/cable, a structure for building, and a structure for civil engineering work. Particularly, the product of the present invention can be suitably used as an adhesive for an automotive part, for example, is useful as an FIPG material.

EXAMPLES

Hereinafter, the present invention is described in more detail with reference to Examples and Comparative Examples, but the present invention is not limited to the following Examples. A viscosity is a value measured by a rotational viscometer at 23° C. according to the method specified in JIS Z 8803. Note that Me represents a methyl group, and Et represents an ethyl group in the following formulas.

Synthesis Example 1

Into a 1 L three-necked flask equipped with a thermometer, a dropping funnel, a stirrer, and a reflux tube, 592.8 g (4 mol) of vinyltrimethoxysilane and 64 g of methanol were put and cooled to 5° C. in an ice bath. Next, 18 g (2 mol) of deionized water, 0.12 g of concentrated hydrochloric acid, and 32 g of methanol were mixed and put into the dropping funnel and added dropwise over two hours such that the internal temperature did not become 10° C. or higher. After completion of the dropwise addition, the internal temperature was raised to 60° C. using an oil bath, and a reaction was caused for four hours. Next, 1.2 g of propylene oxide was added, and a reaction was caused for one hour. After completion of the reaction, distillation was performed at 100° C. under atmospheric pressure and nitrogen flow, and methanol was distilled off to obtain 415.5 g of a siloxane oligomer-containing compound which was a partial hydrolytic condensate (yield: 70% by weight). This compound is referred to as curing agent 1. Gas chromatographic analysis revealed that this compound was a mixture of partial hydrolytic condensates represented by the following formula (dimer ($n1=0$): 45 mol %, trimer ($n1=1$): 25 mol %, tetramer ($n1=2$): 10 mol %, pentamer ($n1=3$): 2 mol %) containing 18 mol % of vinyltrimethoxysilane.

[Chem. 76]

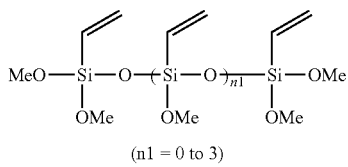

($n1 = 0$ to 3)

Synthesis Example 2

Into a 1 L three-necked flask equipped with a thermometer, a dropping funnel, a stirrer, and a reflux tube, 592.8 g (4 mol) of vinyltrimethoxysilane and 64 g of methanol were put and cooled to 5° C. in an ice bath. Next, 36 g (4 mol) of deionized water, 0.12 g of concentrated hydrochloric acid, and 32 g of methanol were mixed and put into the dropping funnel and added dropwise over two hours such that the internal temperature did not become 10° C. or higher. After completion of the dropwise addition, the internal temperature was raised to 60° C. using an oil bath, and a reaction was caused for four hours. Next, 1.2 g of propylene oxide was added, and a reaction was caused for one hour. After completion of the reaction, distillation was performed at 100° C. under atmospheric pressure and nitrogen flow, and methanol was distilled off to obtain 316.9 g of a siloxane oligomer (compound) which was a partial hydrolytic condensate (yield: 53% by weight). This compound is referred to as curing agent 2. Gas chromatographic analysis revealed that this compound was a mixture of partial hydrolytic condensates represented by the following formula (dimer ($n1=0$): 8 mol %, trimer ($n1=1$): 20 mol %, tetramer ($n1=2$): 40 mol %, pentamer ($n1=3$): 21 mol %, hexamer ($n1=4$): 7 mol %, heptamer ($n1=5$): 4 mol %).

[Chem. 77]

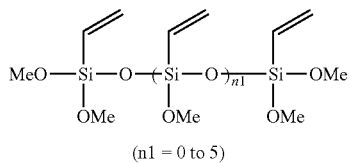

($n1 = 0$ to 5)

Synthesis Example 3

Into a 1 L three-necked flask equipped with a thermometer, a dropping funnel, a stirrer, and a reflux tube, 761.2 g (4 mol) of vinyltriethoxysilane and 92 g of ethanol were put and cooled to 5° C. in an ice bath. Next, 18 g (2 mol) of deionized water, 0.12 g of concentrated hydrochloric acid, and 46 g of ethanol were mixed and put into the dropping funnel and added dropwise over two hours such that the internal temperature did not become 10° C. or higher. After completion of the dropwise addition, the internal temperature was raised to 80° C. using an oil bath, and a reaction was caused for four hours. Next, 1.2 g of propylene oxide was added, and a reaction was caused for one hour. After completion of the reaction, distillation was performed at 100° C. under atmospheric pressure and nitrogen flow, and methanol was distilled off to obtain 542.6 g of a siloxane oligomer-containing compound which was a partial hydrolytic condensate (yield: 71% by weight). This compound is referred to as curing agent 3. Gas chromatographic analysis revealed that this compound was a mixture of partial hydrolytic condensates represented by the following formula (dimer ($n1=0$): 47 mol %, trimer ($n1=1$): 27 mol %, tetramer ($n1=2$): 9 mol %, pentamer ($n1=3$): 1 mol %) containing 16% of vinyltriethoxysilane.

[Chem. 78]

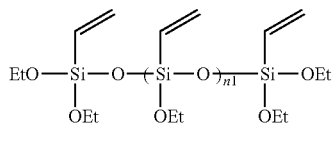

($n1 = 0$ to 3)

Synthesis Example 4

Into a 1 L three-necked flask equipped with a thermometer, a dropping funnel, a stirrer, and a reflux tube, 444.6 g (3 mol) of vinyltrimethoxysilane, 136.2 g (1 mol) of methyltrimethoxysilane, and 64 g of methanol were put and cooled to 5° C. in an ice bath. Next, 18 g (2 mol) of deionized water, 0.12 g of concentrated hydrochloric acid, and 32 g of methanol were mixed and put into the dropping funnel and added dropwise over two hours such that the internal temperature did not become 10° C. or higher. After completion of the dropwise addition, the internal temperature was raised to 60° C. using an oil bath, and a reaction was caused for four hours. Next, 1.2 g of propylene oxide was added, and a reaction was caused for one hour. After completion of the reaction, distillation was performed at 100° C. under atmospheric pressure and nitrogen flow, and methanol was distilled off to obtain 409.1 g of a siloxane oligomer-containing compound which was a partial co-hydrolytic condensate (yield: 70% by weight). This compound is referred to as curing agent 4. Gas chromatographic analysis revealed that this compound was a mixture of partial co-hydrolytic condensates of a dimer to a pentamer (m1+l1=0 to 3) represented by the following formula, containing 10 mol % of methyltrimethoxysilane and 8 mol % of vinyltrimethoxysilane.

[Chem. 79]

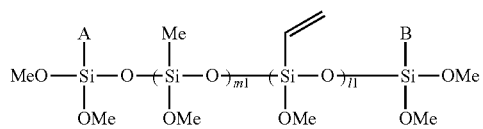

wherein A and B each represent a vinyl group or a methyl group, A and B are independent of each other and may be the same or different, m1 represents a positive number of 0 to 3, and l1 represents a positive number of 0 to 3, provided that m1+l1≤3, and a molar ratio of methyl group:vinyl group in the whole molecular structure is 1:3.

Synthesis Example 5

Into a 1 L three-necked flask equipped with a thermometer, a dropping funnel, a stirrer, and a reflux tube, 444.6 g (3 mol) of vinyltrimethoxysilane, 198.3 g (1 mol) of phenyltrimethoxysilane, and 64 g of methanol were put and cooled to 5° C. in an ice bath. Next, 18 g (2 mol) of deionized water, 0.12 g of concentrated hydrochloric acid, and 32 g of methanol were mixed and put into the dropping funnel and added dropwise over two hours such that the internal temperature did not become 10° C. or higher. After completion of the dropwise addition, the internal temperature was raised to 60° C. using an oil bath, and a reaction was caused for four hours. Next, 1.2 g of propylene oxide was added, and a reaction was caused for one hour. After completion of the reaction, distillation was performed at 100° C. under atmospheric pressure and nitrogen flow, and methanol was distilled off to obtain 462.3 g of a siloxane oligomer-containing compound which was a partial co-hydrolytic condensate (yield: 72% by weight). This compound is referred to as curing agent 5. Gas chromatographic analysis revealed that this compound was a mixture of partial co-hydrolytic condensates of a dimer to a pentamer (m1+l1=0 to 3) represented by the following formula, containing 11 mol % of vinyltrimethoxysilane and 6 mol % of phenyltrimethoxysilane.

[Chem. 80]

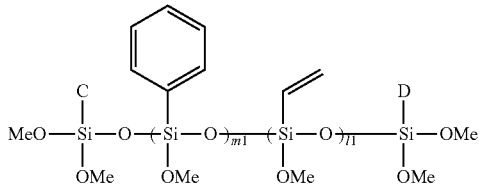

wherein C and D each represent a vinyl group or a phenyl group, C and D are independent of each other and may be the same or different, m1 represents a positive number of 0 to 3, and l1 represents a positive number of 0 to 3, provided that m1+l1≤3, and a molar ratio of phenyl group:vinyl group in the whole molecular structure is 1:3.

Synthesis Example 6

Into a 1 L three-necked flask equipped with a thermometer, a dropping funnel, a stirrer, and a reflux tube, 444.6 g (3 mol) of vinyltrimethoxysilane, 132.2 g (1 mol) of methylvinyldimethoxysilane, and 64 g of methanol were put and cooled to 5° C. in an ice bath. Next, 18 g (2 mol) of deionized water, 0.12 g of concentrated hydrochloric acid, and 32 g of methanol were mixed and put into the dropping funnel and added dropwise over two hours such that the internal temperature did not become 10° C. or higher. After completion of the dropwise addition, the internal temperature was raised to 60° C. using an oil bath, and a reaction was caused for four hours. Next, 1.2 g of propylene oxide was added, and a reaction was caused for one hour. After completion of the reaction, distillation was performed at 100° C. under atmospheric pressure and nitrogen flow, and methanol was distilled off to obtain 392.2 g of a siloxane oligomer-containing compound which was a partial co-hydrolytic condensate (yield: 68% by weight). This compound is referred to as curing agent 6. Gas chromatographic analysis revealed that this compound was a mixture of partial co-hydrolytic condensates of a dimer to a pentamer (m1+l1=0 to 3) represented by the following formula, containing 12 mol % of methylvinyldimethoxysilane and 5 mol % of vinyltrimethoxysilane.

[Chem. 81]

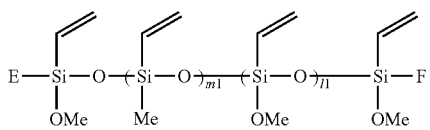

wherein E and F each represent a methoxy group or a methyl group, E and F are independent of each other and may be the same or different, m1 represents a positive number of 0 to 3, and l1 represents a positive number of 0 to 3, provided that m1+l1≤3, and a molar ratio of methyl group:methoxy group in the whole molecular structure is 1:3.

Example 1

To (A) 100 parts by weight of a dimethylpolysiloxane having a terminal blocked with a silanol group and having a viscosity of 20,000 mPa·s at 23° C., 50 parts by weight of heavy calcium carbonate having a surface treated with a paraffin-based compound (product name: MC Coat P-20, manufactured by Maruo Calcium Co., Ltd.), 50 parts by weight of colloidal calcium carbonate having a surface treated with a fatty acid (product name: CARLEX 300, manufactured by Maruo Calcium Co., Ltd.), and 10 parts by weight of carbon black (product name: Denka Black, manufactured by Denka Corporation) were added and thoroughly mixed. Thereafter, (B) 10 parts by weight of curing agent 1 and 0.5 parts by weight of 1,1,3,3-tetramethyl-2-[3-(trimethoxysilyl) propyl] guanidine as a catalyst component were added and mixed under reduced pressure. Next, (C) 1 part by weight of a compound obtained by a desalting reaction of xylylenediamine and 3-chloropropyltrimethoxysilane (product name: CF-73, manufactured by Shin-Etsu Chemical Co., Ltd.) and 2 parts by weight of hexamethyldisilazane as a storability improving component were added, and then the resulting mixture was thoroughly mixed under reduced pressure to obtain composition 1.

Example 2

To (A) 100 parts by weight of a dimethylpolysiloxane having a terminal blocked with a silanol group and having a viscosity of 20,000 mPa·s at 23° C., 50 parts by weight of heavy calcium carbonate having a surface treated with a paraffin-based compound (product name: MC Coat P-20, manufactured by Maruo Calcium Co., Ltd.), 50 parts by weight of colloidal calcium carbonate having a surface treated with a fatty acid (product name: CARLEX 300, manufactured by Maruo Calcium Co., Ltd.), and 10 parts by weight of carbon black (product name: Denka Black, manufactured by Denka Corporation) were added and thoroughly mixed. Thereafter, (B) 10 parts by weight of curing agent 2 and 0.5 parts by weight of 1,1,3,3-tetramethyl-2-[3-(trimethoxysilyl) propyl] guanidine as a catalyst component were added and mixed under reduced pressure. Next, (C) 1 part by weight of a compound obtained by a desalting reaction of xylylenediamine and 3-chloropropyltrimethoxysilane (product name: CF-73, manufactured by Shin-Etsu Chemical Co., Ltd.) and 2 parts by weight of hexamethyldisilazane as a storability improving component were added, and then the resulting mixture was thoroughly mixed under reduced pressure to obtain composition 2.

Example 3

To (A) 100 parts by weight of a dimethylpolysiloxane having a terminal blocked with a silanol group and having a viscosity of 20,000 mPa·s at 23° C., 50 parts by weight of heavy calcium carbonate having a surface treated with a paraffin-based compound (product name: MC Coat P-20, manufactured by Maruo Calcium Co., Ltd.), 50 parts by weight of colloidal calcium carbonate having a surface treated with a fatty acid (product name: CARLEX 300, manufactured by Maruo Calcium Co., Ltd.), and 10 parts by weight of carbon black (product name: Denka Black, manufactured by Denka Corporation) were added and thoroughly mixed. Thereafter, (B) 10 parts by weight of curing agent 3 and 0.5 parts by weight of 1,1,3,3-tetramethyl-2-[3-(trimethoxysilyl) propyl] guanidine as a catalyst component were added and mixed under reduced pressure. Next, (C) 1 part by weight of a compound obtained by a desalting reaction of xylylenediamine and 3-chloropropyltrimethoxysilane (product name: CF-73, manufactured by Shin-Etsu Chemical Co., Ltd.) and 2 parts by weight of hexamethyldisilazane as a storability improving component were added, and then the resulting mixture was thoroughly mixed under reduced pressure to obtain composition 3.

Example 4

To (A) 100 parts by weight of a dimethylpolysiloxane having a terminal blocked with a silanol group and having a viscosity of 20,000 mPa·s at 23° C., 50 parts by weight of heavy calcium carbonate having a surface treated with a paraffin-based compound (product name: MC Coat P-20, manufactured by Maruo Calcium Co., Ltd.), 50 parts by weight of colloidal calcium carbonate having a surface treated with a fatty acid (product name: CARLEX 300, manufactured by Maruo Calcium Co., Ltd.), and 10 parts by weight of carbon black (product name: Denka Black, manufactured by Denka Corporation) were added and thoroughly mixed. Thereafter, (B) 10 parts by weight of curing agent 4 and 0.5 parts by weight of 1,1,3,3-tetramethyl-2-[3-(trimethoxysilyl) propyl] guanidine as a catalyst component were added and mixed under reduced pressure. Next, (C) 1 part by weight of a compound obtained by a desalting reaction of xylylenediamine and 3-chloropropyltrimethoxysilane (product name: CF-73, manufactured by Shin-Etsu Chemical Co., Ltd.) and 2 parts by weight of hexamethyldisilazane as a storability improving component were added, and then the resulting mixture was thoroughly mixed under reduced pressure to obtain composition 4.

Example 5

To (A) 100 parts by weight of a dimethylpolysiloxane having a terminal blocked with a silanol group and having a viscosity of 20,000 mPa·s at 23° C., 50 parts by weight of heavy calcium carbonate having a surface treated with a paraffin-based compound (product name: MC Coat P-20, manufactured by Maruo Calcium Co., Ltd.), 50 parts by weight of colloidal calcium carbonate having a surface treated with a fatty acid (product name: CARLEX 300, manufactured by Maruo Calcium Co., Ltd.), and 10 parts by weight of carbon black (product name: Denka Black, manufactured by Denka Corporation) were added and thoroughly mixed. Thereafter, (B) 10 parts by weight of curing agent 5 and 0.5 parts by weight of 1,1,3,3-tetramethyl-2-[3-(trimethoxysilyl) propyl] guanidine as a catalyst component were added and mixed under reduced pressure. Next, (C) 1 part by weight of a compound obtained by a desalting reaction of xylylenediamine and 3-chloropropyltrimethoxysilane (product name: CF-73, manufactured by Shin-Etsu Chemical Co., Ltd.) and 2 parts by weight of hexamethyldisilazane as a storability improving component were added, and then the resulting mixture was thoroughly mixed under reduced pressure to obtain composition 5.

Example 6

To (A) 100 parts by weight of a dimethylpolysiloxane having a terminal blocked with a silanol group and having a viscosity of 20,000 mPa·s at 23° C., 50 parts by weight of heavy calcium carbonate having a surface treated with a paraffin-based compound (product name: MC Coat P-20, manufactured by Maruo Calcium Co., Ltd.), 50 parts by weight of colloidal calcium carbonate having a surface treated with a fatty acid (product name: CARLEX 300, manufactured by Maruo Calcium Co., Ltd.), and 10 parts by weight of carbon black (product name: Denka Black, manufactured by Denka Corporation) were added and thoroughly mixed. Thereafter, (B) 10 parts by weight of curing agent 6 and 0.5 parts by weight of 1,1,3,3-tetramethyl-2-[3-(trimethoxysilyl) propyl] guanidine as a catalyst component were added and mixed under reduced pressure. Next, (C) 1 part by weight of a compound obtained by a desalting reaction of xylylenediamine and 3-chloropropyltrimethoxysilane (product name: CF-73, manufactured by Shin-Etsu Chemical Co., Ltd.) and 2 parts by weight of hexamethyldisilazane as a storability improving component were added, and then the resulting mixture was thoroughly mixed under reduced pressure to obtain composition 6.

Example 7

To (A) 100 parts by weight of a dimethylpolysiloxane having a terminal blocked with a silanol group and having a viscosity of 20,000 mPa·s at 23° C., 50 parts by weight of heavy calcium carbonate having a surface treated with a paraffin-based compound (product name: MC Coat P-20, manufactured by Maruo Calcium Co., Ltd.), 50 parts by weight of colloidal calcium carbonate having a surface treated with a fatty acid (product name: CARLEX 300, manufactured by Maruo Calcium Co., Ltd.), and 10 parts by weight of carbon black (product name: Denka Black, manufactured by Denka Corporation) were added and thoroughly mixed. Thereafter, (B) 10 parts by weight of curing agent 1 and 0.5 parts by weight of 1,1,3,3-tetramethyl-2-[3-(trimethoxysilyl) propyl] guanidine as a catalyst component were added and mixed under reduced pressure. Next, (C) 1 part by weight of a compound obtained by a desalting reaction of xylylenediamine and 3-chloropropyltriethoxysilane and 2 parts by weight of hexamethyldisilazane as a storability improving component were added, and then the resulting mixture was thoroughly mixed under reduced pressure to obtain composition 7.

Example 8

To (A) 100 parts by weight of a dimethylpolysiloxane having a terminal blocked with a silanol group and having a viscosity of 20,000 mPa·s at 23° C., 50 parts by weight of heavy calcium carbonate having a surface treated with a paraffin-based compound (product name: MC Coat P-20, manufactured by Maruo Calcium Co., Ltd.), 50 parts by weight of colloidal calcium carbonate having a surface treated with a fatty acid (product name: CARLEX 300, manufactured by Maruo Calcium Co., Ltd.), and 10 parts by weight of carbon black (product name: Denka Black, manufactured by Denka Corporation) were added and thoroughly mixed. Thereafter, (B) 10 parts by weight of curing agent 1 and 0.5 parts by weight of 1,1,3,3-tetramethyl-2-[3-(trimethoxysilyl) propyl] guanidine as a catalyst component were added and mixed under reduced pressure. Next, (C) 1 part by weight of a compound obtained by a desalting reaction of xylylenediamine and 3-chloropropylmethyldimethoxysilane and 2 parts by weight of hexamethyldisilazane as a storability improving component were added, and then the resulting mixture was thoroughly mixed under reduced pressure to obtain composition 8.

Comparative Example 1

To (A) 100 parts by weight of a dimethylpolysiloxane having a terminal blocked with a silanol group and having a viscosity of 20,000 mPa·s at 23° C., 50 parts by weight of heavy calcium carbonate having a surface treated with a paraffin-based compound (product name: MC Coat P-20, manufactured by Maruo Calcium Co., Ltd.), 50 parts by weight of colloidal calcium carbonate having a surface treated with a fatty acid (product name: CARLEX 300, manufactured by Maruo Calcium Co., Ltd.), and 10 parts by weight of carbon black (product name: Denka Black, manufactured by Denka Corporation) were added and thoroughly mixed. Thereafter, 10 parts by weight of vinyltrimethoxysilane as a curing agent and 0.5 parts by weight of 1,1,3,3-tetramethyl-2-[3-(trimethoxysilyl) propyl] guanidine as a catalyst component were added and mixed under reduced pressure. Next, (C) 1 part by weight of a compound obtained by a desalting reaction of xylylenediamine and 3-chloropropyltrimethoxysilane (product name: CF-73, manufactured by Shin-Etsu Chemical Co., Ltd.) and 2 parts by weight of hexamethyldisilazane as a storability improving component were added, and then the resulting mixture was thoroughly mixed under reduced pressure to obtain composition 9.

Comparative Example 2

To (A) 100 parts by weight of a dimethylpolysiloxane having a terminal blocked with a silanol group and having a viscosity of 20,000 mPa·s at 23° C., 50 parts by weight of heavy calcium carbonate having a surface treated with a paraffin-based compound (product name: MC Coat P-20, manufactured by Maruo Calcium Co., Ltd.), 50 parts by weight of colloidal calcium carbonate having a surface treated with a fatty acid (product name: CARLEX 300, manufactured by Maruo Calcium Co., Ltd.), and 10 parts by weight of carbon black (product name: Denka Black, manufactured by Denka Corporation) were added and thoroughly mixed. Thereafter, (B) 10 parts by weight of curing agent 1 and 0.5 parts by weight of 1,1,3,3-tetramethyl-2-[3-(trimethoxysilyl) propyl] guanidine as a catalyst component were added and mixed under reduced pressure. Next, 1 part by weight of 3-aminopropyltrimethoxysilane and 2 parts by weight of hexamethyldisilazane as a storability improving component were added, and then the resulting mixture was thoroughly mixed under reduced pressure to obtain composition 10.

Comparative Example 3

To (A) 100 parts by weight of a dimethylpolysiloxane having a terminal blocked with a silanol group and having a viscosity of 20,000 mPa·s at 23° C., 50 parts by weight of heavy calcium carbonate having a surface treated with a paraffin-based compound (product name: MC Coat P-20, manufactured by Maruo Calcium Co., Ltd.), 50 parts by weight of colloidal calcium carbonate having a surface treated with a fatty acid (product name: CARLEX 300, manufactured by Maruo Calcium Co., Ltd.), and 10 parts by weight of carbon black (product name: Denka Black, manufactured by Denka Corporation) were added and thoroughly mixed. Thereafter, 10 parts by weight of vinyltriethoxysilane as a curing agent and 0.5 parts by weight of 1,1,3,3-tetramethyl-2-[3-(trimethoxysilyl) propyl] guanidine as a catalyst component were added and mixed under reduced pressure. Next, (C) 1 part by weight of a compound obtained by a desalting reaction of xylylenediamine and 3-chloropropyltrimethoxysilane (product name: CF-73, manufactured by Shin-Etsu Chemical Co., Ltd.) and 2 parts by weight of hexamethyldisilazane as a storability improving component were added, and then the resulting mixture was thoroughly mixed under reduced pressure to obtain composition 11.

[Test Method]
Tack Free Time

Tack free time (touch drying time) was measured according to the method specified in JIS A 5758 using the compositions (room-temperature curable organopolysiloxane compositions) prepared in the above Examples and Comparative Examples. Results are illustrated in Table 1.

Curing Rate

In a curing rate test method, each of the compositions prepared in the above Examples and Comparative Examples was filled in a glass petri dish having an inner diameter of 10 mm, and was allowed to stand at 23° C. and 50% RH for one day. Thereafter, a cured thickness from a portion in contact with air was measured. Results are illustrated in Table 1.

Rubber Physical Properties

Each of the compositions prepared in the above Examples and Comparative Examples was poured into a die of 2 mm and cured at 23° C. and 50% RH for seven days to obtain a rubber sheet having a thickness of 2 mm. Rubber physical properties (hardness, elongation at break, and tensile strength) were measured according to JIS K 6249. Results are illustrated in Table 1.

Adhesiveness

For each of the compositions prepared in the above Examples and Comparative Examples, adhesiveness was evaluated by the following method. Results are illustrated in Table 2.

Each of the above compositions was applied onto an adherend so as to have a thickness of about 2 mm and allowed to stand at room temperature for seven days to cure each of the compositions. Then, a simple adhesiveness test was performed by pulling a cured product with a hand. If a cured product of each of the above compositions caused cohesive failure, the cured product was evaluated to be favorable (○). If a cured product of each of the above compositions caused adhesive failure, the cured product was evaluated to be poor (×). Note that evaluation was performed for a polyphenylene sulfide (PPS) resin, nylon 66, nylon 6, an acrylic resin, a polybutylene terephthalate (PBT) resin, a polystyrene (PS) resin, and a polycarbonate (PC) resin as adherends.

Acceleration Test

Regarding tests, a case where each of the compositions prepared in the above

Examples and Comparative Examples was sealed in a polyethylene container, and an acceleration deterioration test was performed for seven days in a dryer at 70° C. was also evaluated. Incidentally, regarding a physical property measurement test, a composition exhibiting such physical properties that tack free time was 10 minutes or less, a curing rate was 1.5 mm or more, hardness was 50 or more, elongation at break was 200% or more, and tensile strength was 1.5 MPa or more both at the initial time and after storage was evaluated to be acceptable (○), and a composition falling outside these values was evaluated to be unacceptable (×). Results are illustrated in Tables 1 and 2.

TABLE 1

| Result of physical property measurement | Unit | Example 1 Composition 1 | 2 Composition 2 | 3 Composition 3 | 4 Composition 4 | 5 Composition 5 | 6 Composition 6 | 7 Composition 7 | 8 Composition 8 | Comparative Example 1 Composition 9 | 2 Composition 10 | 3 Composition 11 |
|---|---|---|---|---|---|---|---|---|---|---|---|---|
| Initial physical properties ||||||||||||| 
| Tack free time | min | 3 | 2 | 8 | 5 | 3 | 5 | 7 | 3 | 12 | 3 | 45 |
| Curing rate | mm/day | 2.1 | 1.9 | 2.3 | 2.1 | 1.9 | 2.3 | 2.1 | 2.2 | 1.7 | 1.8 | 1.1 |
| Hardness (type: A) | — | 61 | 65 | 58 | 59 | 60 | 55 | 59 | 57 | 48 | 65 | 17 |
| Elongation at break | % | 280 | 240 | 310 | 290 | 290 | 340 | 320 | 340 | 360 | 200 | 170 |
| Tensile strength | MPa | 2.2 | 2.4 | 2.1 | 2.2 | 2.1 | 2.0 | 2.1 | 2.2 | 1.6 | 2.4 | 0.5 |
| Physical properties after acceleration test at 70° C. for 7 days |||||||||||||
| Tack free time | min | 4 | 2 | 10 | 6 | 4 | 7 | 7 | 4 | 14 | 6 | 60 |
| Curing rate | mm/day | 2.3 | 2.1 | 2.2 | 1.9 | 1.8 | 2.6 | 2.6 | 2.2 | 1.5 | 1.9 | 0.9 |
| Hardness (type: A) | — | 58 | 61 | 53 | 54 | 55 | 52 | 54 | 55 | 39 | 61 | 8 |
| Elongation at break | % | 310 | 270 | 350 | 320 | 360 | 380 | 360 | 370 | 540 | 280 | 160 |
| Tensile strength | MPa | 2.1 | 2.1 | 2.0 | 2.1 | 1.9 | 1.8 | 1.9 | 2.1 | 1.2 | 2.3 | 0.3 |
| Judgement of acceptability | | Acceptable | Acceptable | Acceptable | Acceptable | Acceptable | Acceptable | Acceptable | Acceptable | Unacceptable | Acceptable | Unacceptable |

The above results indicate that the composition of the present invention has favorable curability, initial physical properties, and storability. Meanwhile, in Comparative Examples 1 and 3, the initial curability was poor, and the change in physical properties after storage was large.

TABLE 2

| Result of adhesiveness evaluation | | Example 1 Composition 1 | 2 Composition 2 | 3 Composition 3 | 4 Composition 4 | 5 Composition 5 | 6 Composition 6 | 7 Composition 7 | 8 Composition 8 | Comparative Example 1 Composition 9 | 2 Composition 10 | 3 Composition 11 |
|---|---|---|---|---|---|---|---|---|---|---|---|---|
| Initial time | PPS | ○ | ○ | ○ | ○ | ○ | ○ | ○ | ○ | × | × | × |
| after storage | Nylon 66 | ○ | ○ | ○ | ○ | ○ | ○ | ○ | ○ | ○ | × | × |

TABLE 2-continued

| | | Example | | | | | | | | Comparative Example | | |
|---|---|---|---|---|---|---|---|---|---|---|---|---|
| | | 1 | 2 | 3 | 4 | 5 | 6 | 7 | 8 | 1 | 2 | 3 |
| Result of | | \multicolumn{11}{c}{Composition} | | | | | | | |
| adhesiveness evaluation | | 1 | 2 | 3 | 4 | 5 | 6 | 7 | 8 | 9 | 10 | 11 |
| at room temperature for 7 days | Nylon 6 | O | O | O | O | O | O | O | O | O | O | X |
| | Acrylic | O | O | O | O | O | O | O | O | X | X | X |
| | PBT | O | O | O | O | O | O | O | O | O | O | X |
| | PS | O | O | O | O | O | O | O | O | O | X | X |
| | PC | O | O | O | O | O | O | O | O | O | X | X |
| After acceleration test at 70° C. for 7 days after storage at room temperature for 7 days | PPS | O | O | O | O | O | O | O | O | X | X | X |
| | Nylon 66 | O | O | O | O | O | O | O | O | X | X | X |
| | Nylon 6 | O | O | O | O | O | O | O | O | O | O | X |
| | Acrylic | O | O | O | O | O | O | O | O | X | X | X |
| | PBT | O | O | O | O | O | O | O | O | O | O | X |
| | PS | O | O | O | O | O | O | O | O | O | X | X |
| | PC | O | O | O | O | O | O | O | O | O | X | X |

The above results indicate that the composition of the present invention has favorable adhesiveness and storability. Meanwhile, in Comparative Examples 1, 2, and 3, adhesiveness is poor from the initial time.

From the above results, it has been confirmed that the dealcoholization type room-temperature curable organopolysiloxane composition of the present invention has favorable physical properties, curability, adhesiveness, and storability despite using no metal catalyst.

The invention claimed is:

1. A dealcoholization type room-temperature curable organopolysiloxane composition comprising
   (A) 100 parts by weight of a diorganopolysiloxane having one silicon atom-bonded hydroxy group and/or one hydrolyzable silyl group at each of both molecular chain terminals and having a viscosity of 20 to 1,000,000 mPa·s at 23° C.,
   (B) 0.1 to 40 parts by weight of an organosiloxane oligomer which has 2 to 102 silicon atom-bonded alkenyl groups in one molecule, and containing at least a mixture of a dimer, a trimer, a tetramer and a pentamer, each of which is a partial (co-)hydrolytic condensate of a hydrolyzable organosilane compound having 1 to 3 silicon atom-bonded unsubstituted or substituted alkoxy groups in one molecule, other than the component (A), and
   (C) 0.001 to 10 parts by weight of a hydrolyzable organosilane compound having at least one phenylene backbone and two or more amino groups in one molecule represented by the following general formula (5) and/or a partial hydrolytic condensate thereof, other than the components (A) and (B):

[Chem. 1]

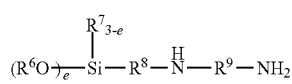
(5)

wherein $R^6$ in each instance independently represents an unsubstituted or substituted monovalent hydrocarbon group having 1 to 18 carbon atoms, $R^7$ represents an unsubstituted monovalent hydrocarbon group having 1 to 18 carbon atoms, $R^8$ represents a divalent hydrocarbon group having 1 to 10 carbon atoms, $R^9$ represents a phenylene backbone-containing divalent hydrocarbon group having 7 to 10 carbon atoms, and e represents a positive number of 1 to 3, with the proviso that at least one of an NH group and an $NH_2$ group is not directly bonded to the phenylene backbone of $R^9$, wherein the dealcoholization type room-temperature curable organopolysiloxane composition is free of a metal catalyst.

2. The dealcoholization type room-temperature curable organopolysiloxane composition according to claim 1, further comprising as a catalyst component (D), one or more selected from the group consisting of a non-silicon-based organic compound, a hydrolyzable organosilane compound and a partial hydrolytic condensate thereof, having at least one guanidine backbone represented by the following general formula (6) in one molecule, other than the components (B) and (C), in an amount of 0.001 to 5 parts by weight per 100 parts by weight of the component (A):

[Chem. 1]

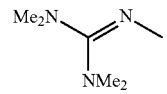
(6)

wherein Me represents a methyl group.

3. The dealcoholization type room-temperature curable organopolysiloxane composition according to claim 1 or 2, further comprising as a storability improving component (E), an organodisilazane compound represented by the following general formula (7), in an amount of 0.5 to 10 parts by weight per 100 parts by weight of the component (A):

[Chem. 2]

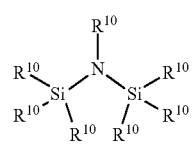
(7)

wherein $R^{10}$ represents a hydrogen atom, an alkyl group having 1 to 3 carbon atoms, or a vinyl group, and all of $R^{10}$s may be the same or different.

4. The dealcoholization type room-temperature curable organopolysiloxane composition according to claim 1, further comprising one or more surface-treated or surface-untreated inorganic fillers selected from the group consisting of calcium carbonate, atomized silica, precipitated silica, carbon black and aluminum oxide, in an amount of 10 to 500 parts by weight per 100 parts by weight of the component (A).

5. The dealcoholization type room-temperature curable organopolysiloxane composition according to claim 1, wherein the component (B) is a partial (co-)hydrolytic condensate of one or more hydrolyzable silane compounds represented by the following general formula (3), or a partial co-hydrolytic condensate of one or more of said hydrolyzable silane compounds and one or more hydrolyzable silane compounds represented by the following general formula (4):

$$R^3_c R^4 Si(OR^5)_{3-c} \quad (3)$$

wherein $R^3$ represents an unsubstituted or substituted monovalent hydrocarbon group free of an aliphatic unsaturated bond having 1 to 18 carbon atoms, $R^4$ represents an alkenyl group having 2 to 10 carbon atoms, $R^5$s each independently represent an unsubstituted or substituted monovalent hydrocarbon group having 1 to 18 carbon atoms, and c represents 0 or 1

$$R^3_d Si(OR^5)_{4-d} \quad (4)$$

wherein $R^3$ and $R^5$ are as defined above, and d represents 0, 1, or 2.

6. The dealcoholization type room-temperature curable organopolysiloxane composition according to claim 1, which is free of an organotin catalyst and a titanium chelate catalyst.

7. The dealcoholization type room-temperature curable organopolysiloxane composition according to claim 1, which is used for an adhesive, a sealing material, a potting agent, or a coating agent.

8. An adhesive, a sealing material, a potting agent, or a coating agent comprising the dealcoholization type room-temperature curable organopolysiloxane composition according to claim 1.

9. The dealcoholization type room-temperature curable organopolysiloxane composition according to claim 1 wherein the component (B) is a mixture containing at least one selected from the organosiloxane oligomers represented by the following formulae:

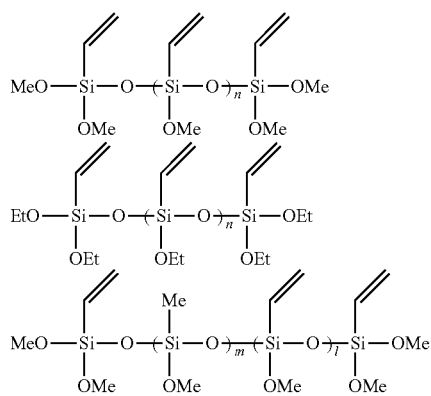

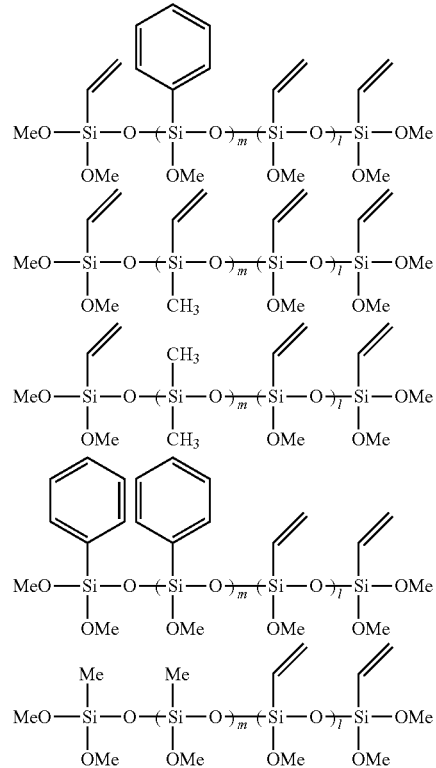

wherein n represents an integer of 0 to 100, m represents an integer of 1 to 100, and l represents an integer of 0 to 99, provided that m+1=1 to 100, and Me represents a methyl group, and Et represents an ethyl group.

10. The dealcoholization type room-temperature curable organopolysiloxane composition according to claim 1 wherein the organosiloxane oligomer (B) comprises 8 to 47 mol % of the dimer, 20 to 27 mol % of the trimer, 9 to 40 mol % of the tetramer and 1 to 21 mol % of the pentamer.

11. The dealcoholization type room-temperature curable organopolysiloxane composition according to claim 10 wherein the total content of the dimer, trimer, tetramer and pentamer in the component (B) is 82 to 89 mol %.

12. The dealcoholization type room-temperature curable organopolysiloxane composition according to claim 1, which provides a cured product to be bonded to nylon 6, an acrylic resin, a polybutylene terephthalate resin, a polystyrene resin, or a polycarbonate resin.

13. An automotive part sealed by a cured product of the dealcoholization type room-temperature curable organopolysiloxane composition according to claim 1.

14. An automotive oil seal sealed by a cured product of the dealcoholization type room-temperature curable organopolysiloxane composition according to claim 1.

15. An electric or electronic part sealed by a cured product of the dealcoholization type room-temperature curable organopolysiloxane composition according to claim 1.

16. A structure for building or civil engineering work sealed by a cured product of the dealcoholization type room-temperature curable organopolysiloxane composition according to claim 1.

* * * * *